US008141879B2

(12) United States Patent
Venkataraman et al.

(10) Patent No.: US 8,141,879 B2

(45) Date of Patent: Mar. 27, 2012

(54) SEALS FOR A TURBINE ENGINE, AND METHODS OF ASSEMBLING A TURBINE ENGINE

(75) Inventors: Krishna Kumar Venkataraman, Simpsonville, SC (US); Kevin Weston McMahan, Greer, SC (US); Timur R. Repikov, Moscow (RU); Kara Edwards, Greer, SC (US)

(73) Assignee: General Electric Company, Schenectady, NY (US)

(*) Notice: Subject to any disclaimer, the term of this patent is extended or adjusted under 35 U.S.C. 154(b) by 367 days.

(21) Appl. No.: 12/505,778

(22) Filed: Jul. 20, 2009

(65) Prior Publication Data

US 2011/0014029 A1 Jan. 20, 2011

(51) Int. Cl.

*F16J 15/02* (2006.01)
*F01D 25/16* (2006.01)
*F01D 5/00* (2006.01)

(52) U.S. Cl. ..... 277/312; 277/314; 277/644; 415/174.2; 415/170.1

(58) Field of Classification Search .................. 277/630, 277/637, 641, 644, 312, 314; 415/173.1, 415/170.1, 174.2, 229–230

See application file for complete search history.

(56) References Cited

U.S. PATENT DOCUMENTS

| | | | | |
|---|---|---|---|---|
| 3,965,066 | A | 6/1976 | Sterman et al. | |
| 5,289,677 | A | 3/1994 | Jarrell | |
| 6,464,232 | B1 * | 10/2002 | Marchi et al. | 277/630 |
| 6,599,089 | B2 * | 7/2003 | Aksit et al. | 415/191 |
| 7,140,840 | B2 * | 11/2006 | Taillant et al. | 415/191 |
| 2005/0063816 | A1 | 3/2005 | Jorgensen | |
| 2006/0076126 | A1 * | 4/2006 | Fandry | 165/159 |

* cited by examiner

*Primary Examiner* — Vishal Patel

(74) *Attorney, Agent, or Firm* — Nixon & Vanderhye P.C.

(57) ABSTRACT

A side seal for sealing the side edges of adjacent combustors of a turbine engine include extended ends. The extended ends of the side seal abut and seal against inner and outer circumferential seals to prevent leakage of combustion gases.

5 Claims, 6 Drawing Sheets

SEALS FOR A TURBINE ENGINE, AND METHODS OF ASSEMBLING A TURBINE ENGINE

BACKGROUND OF THE INVENTION

In some land-based turbine engines used in electrical power generating facilities, a plurality of combustors are arranged around the circumference of the turbine engine, and each of the combustors delivers hot combustion gases into the turbine section of the engine. The inlet to the turbine section is formed as an annulus that includes an inner annulus wall and an outer annulus wall. The outlets of the combustors are joined to the turbine inlet annulus. The outlet of each combustor is essentially rectangular shaped. However, the upper and lower sides of the outlet are arc-shaped such that when all of the combustors are arranged side-by-side around the exterior circumference of the turbine engine, the outlets of the combustors join to the circular shaped inlet annulus of the turbine section of the engine.

Circumferential seals are provided between the inner and outer annulus walls of the turbine inlet and the corresponding surfaces of the combustor outlets. In addition, side seals are located between the sides of each pair of adjacent combustors.

The outlet of each of the combustors and the turbine inlet annulus contain extremely hot combustion gases when the engine is operating. As a result, when a turbine is brought online, both the outlet portions of the combustors, and the elements of the turbine inlet annulus experience a large temperature swing. The thermal cycling between room temperature and the high temperatures that exist during normal operations can cause significant thermal expansions to occur. And because of the complex shapes of the individual elements which come together at the inlet annulus, the expansions can be non-uniform and unpredictable. As a result, it is common for small apertures to develop between the inlet annulus and the outlets of the combustors. One common location for such apertures to develop is at the corners of the combustor outlets, where the side seal between adjacent combustors meets the inner and outer circumferential seals. These apertures allow the hot combustion gases to leak. And this leakage of combustion gases represents an undesirable efficiency loss.

BRIEF DESCRIPTION OF THE INVENTION

In one aspect, the invention may be embodied in a method of sealing a plurality of combustors to an inlet annulus of a turbine engine that includes arranging a plurality of combustors around the inlet annulus, mounting an inner circumferential seal between the inner annulus wall and corresponding surfaces of each of the combustor outlets, and mounting an outer circumferential seal between the outer annulus wall and corresponding surfaces of each of the combustor outlets. The method also includes mounting a side seal between each pair of adjacent combustor outlets to seal a space between sides of the combustor outlets, wherein a first end of each side seal abuts a rear side of the outer circumferential seal and extends across substantially the entire height of the outer circumferential seal.

In another aspect, the invention may be embodied in a method of sealing a plurality of combustors to an inlet annulus of a turbine engine that includes arranging a plurality of combustors around the inlet annulus, mounting an inner circumferential seal between the inner annulus wall and corresponding surfaces of each of the combustor outlets, and mounting an outer circumferential seal between the outer annulus wall and corresponding surfaces of each of the combustor outlets. The method also includes mounting a side seal between each pair of adjacent combustor outlets to seal a space between sides of the combustor outlets, wherein a first end of each side seal abuts a rear side of the inner circumferential seal and extends across substantially the entire height of the inner circumferential seal.

In another aspect, the invention may be embodied in a side seal for sealing a space between sides of adjacent combustor outlets that are mounted to an inlet annulus of a turbine engine. The side seal includes a central portion that is configured to seal a space between side edges of two adjacent combustor outlets, and a first end extending from the central portion and configured to abut and seal against a rear side of an outer circumferential seal and to extend across substantially an entire height of the outer circumferential seal.

DETAILED DESCRIPTION OF THE INVENTION

Figure 1:
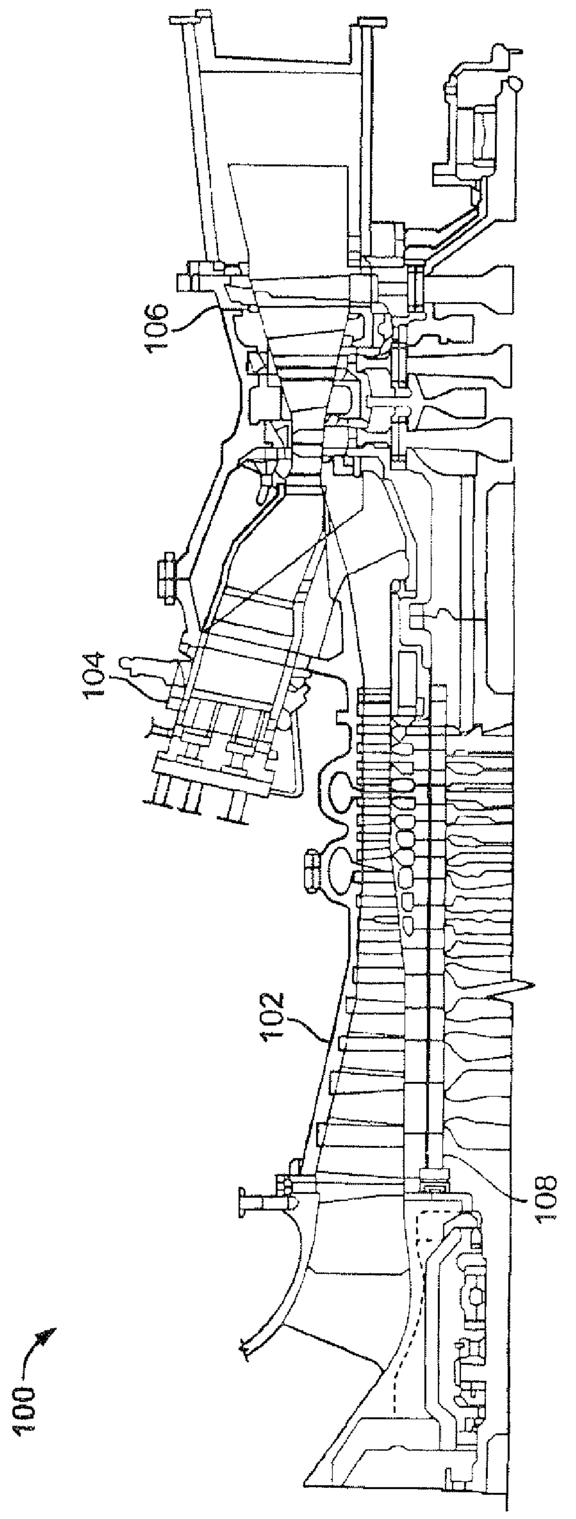
FIG. 1 is a partial cross sectional view of a turbine engine.

FIG. 1 illustrates some of the major elements of a typical turbine engine which would be used in a power generating facility. The turbine engine 100 includes a compressor section 102 which compresses incoming air and delivers it to a combustor 104. The compressed air is mixed with fuel in the combustor 104 and the air fuel mixture is ignited. The resulting hot combustion gases are then sent through an outlet of the combustor 104 into an inlet annulus of the turbine section 106.

As mentioned above, a plurality of combustors 104 would be arranged around the exterior circumference of the turbine engine 100. The outlets of each of the combustors 104 would be attached to an inlet annulus which opens into the turbine section 106 of the engine 100.

Figure 2:
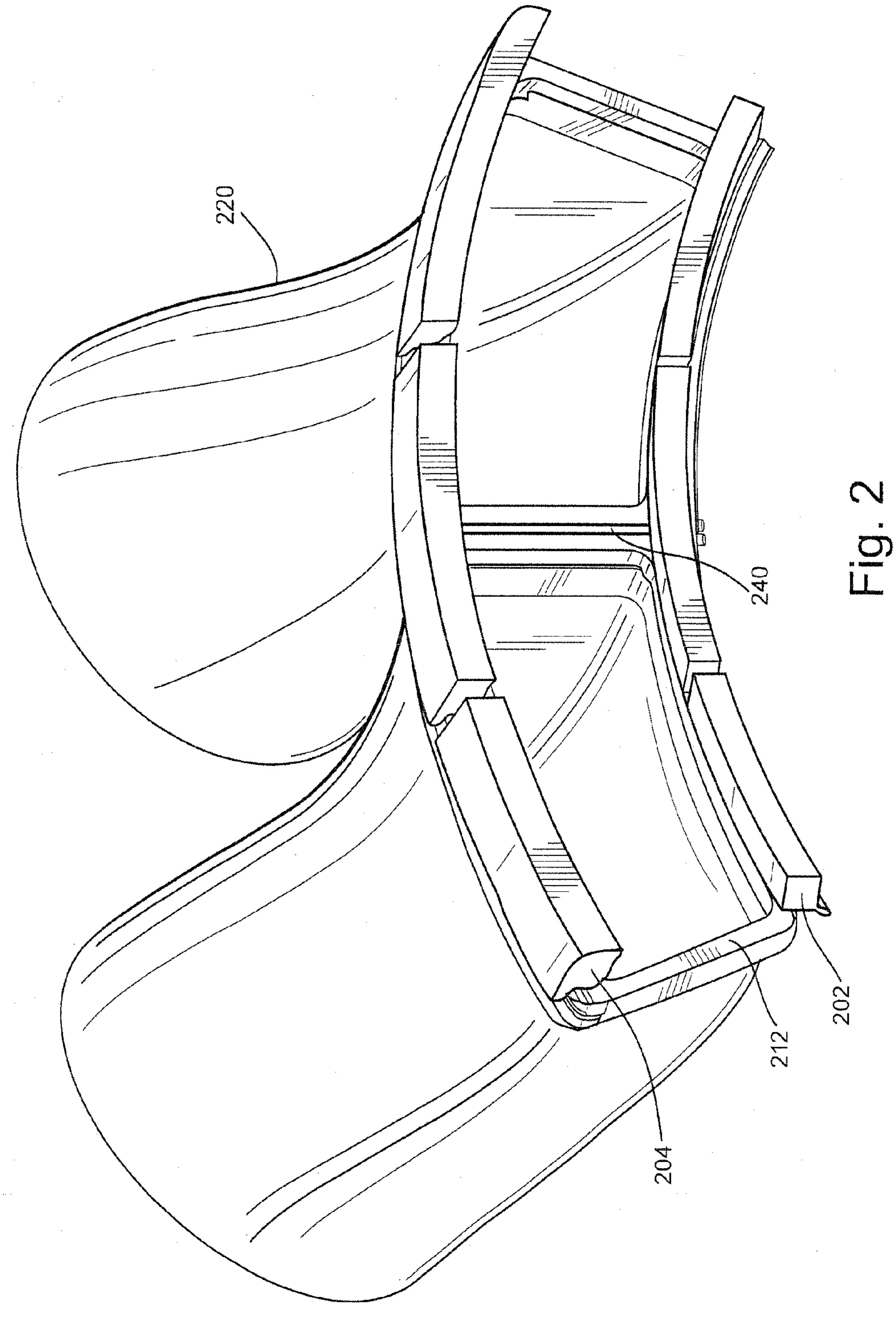
FIG. 2 is a perspective view illustrating how two adjacent combustor outlets are joined to a turbine inlet annulus.

FIG. 2 illustrates how two adjacent combustor outlets are joined to the inlet annulus which opens into the turbine section 106 of the engine 100. The inlet annulus is formed by the inner annulus wall 202 and the outer annulus wall 204. The upper and lower arcuate surfaces of the outlets of the combustors 220 are joined to the inner and outer annulus walls 202 and 204. An inner circumferential seal is mounted between the inner annulus wall 202 and the lower walls of each of the combustor outlets. Likewise, an outer circumferential seal is mounted between the outer annulus wall 204 and the upper walls of each of the individual combustor outlets.

In addition, a side seal 240 is located between the side surfaces of each pair of adjacent combustor outlets. The side seal 240 provides a seal between adjacent combustors so that the combustion gases cannot leak from between the sides of the combustor outlets.

Figure 3:
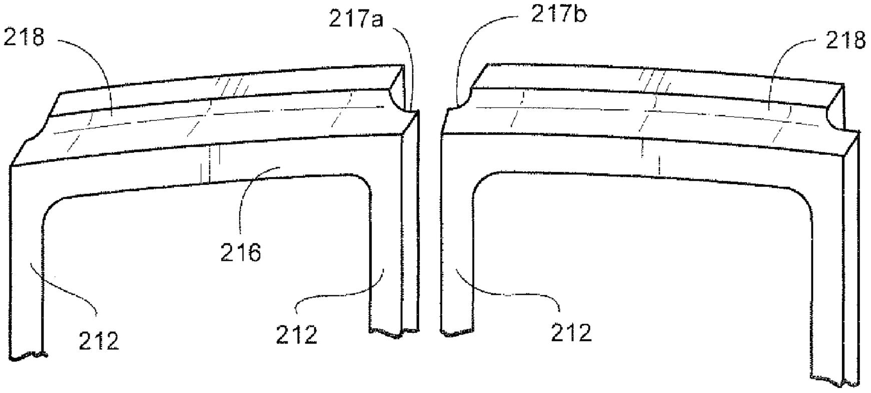
FIG. 3 is a partial perspective view illustrating the upper surfaces of two adjacent combustors which are to be attached to a turbine inlet annulus.

FIG. 3 provides a more detailed view of the outlets of two adjacent combustors. As shown in FIG. 3, the outlets include sidewall portions 212 and upper wall portions 216. Corresponding lower wall portions (not shown) would be located at the bottom of each combustor outlet. The outer circumferential seal is mounted against an angled or curved outer seal surface 218 located at the top of each combustor outlet upper wall 216. The inner circumferential seal is mounted against a similar angled or curved inner seal surface on the bottom of each combustor outlet. The curved or angled surfaces might be flat, depending on design requirements and other considerations.

Figure 4:
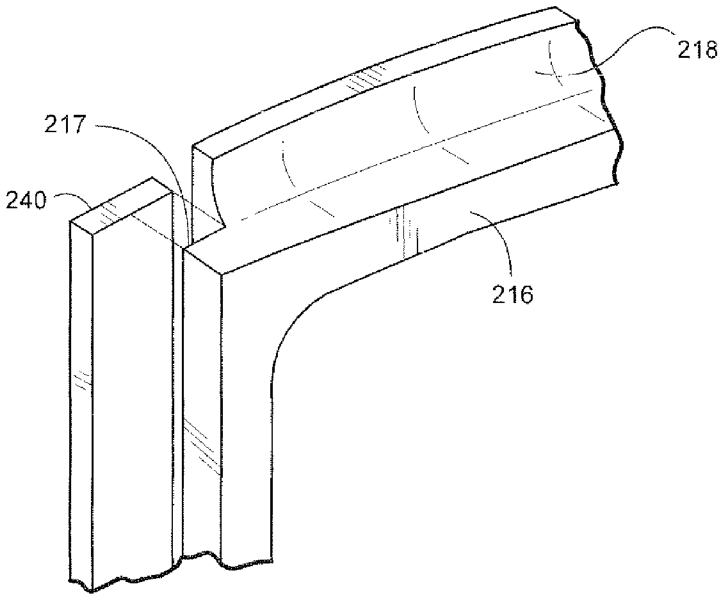
FIG. 4 is a partial cross sectional view of an upper side corner of a combustor outlet illustrating how a side seal is coupled to the combustor outlet.
Figure 5:
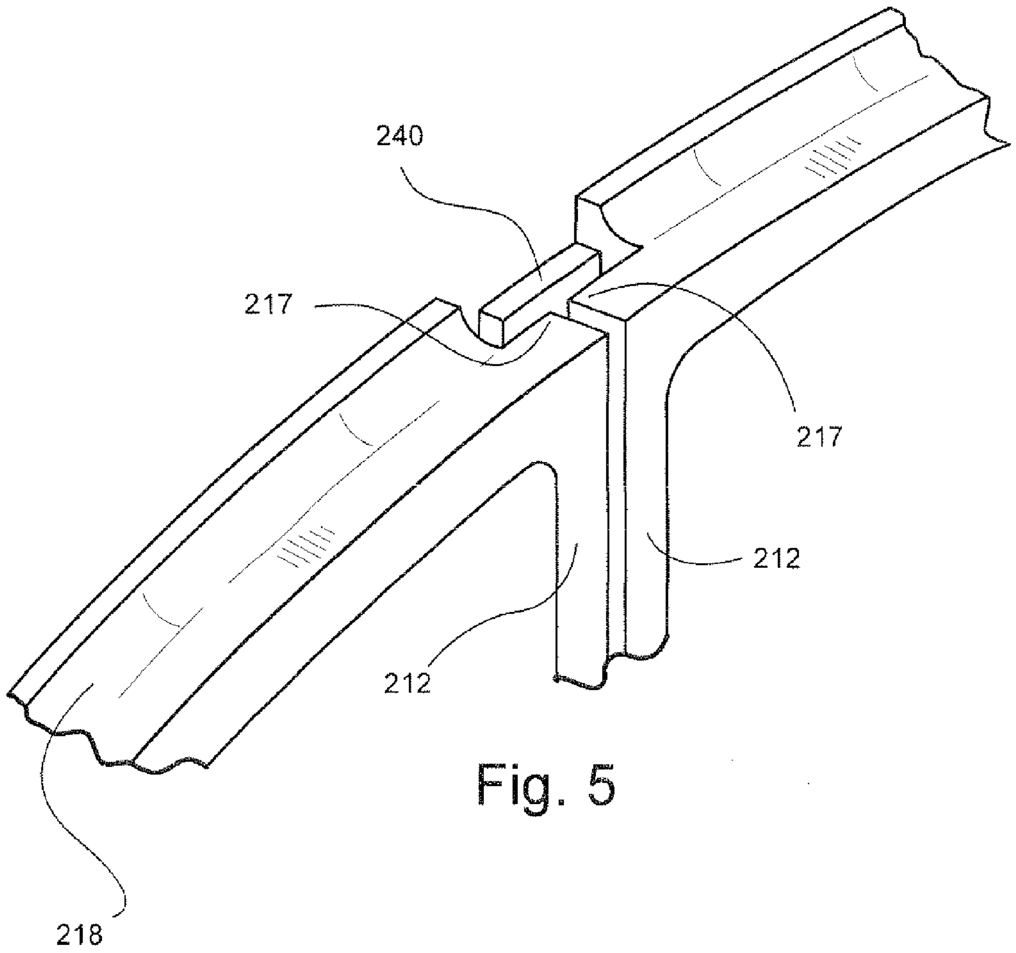
FIG. 5 is a partial perspective view illustrating how a side seal is joined to two adjacent combustor outlets.

FIG. 4 illustrates how a side seal 240 is mounted between each pair of adjacent combustors outlets. As shown therein, the side seal is mounted against rear flange surfaces 217 that run down the rear of the sides of the combustor outlets. FIG. 5 illustrates how a side seal 240 is mounted against the adjacent rear flange surfaces 217 of two adjacent combustor outlets to provide a seal between the adjacent combustors.

Figure 6A:
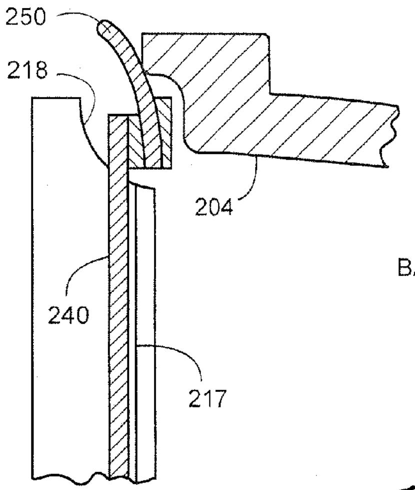
Fig. 6a BACKGROUND ART
FIG. 6A is a partial cross-sectional view illustrating how a combustor outlet is joined to the outer annulus wall of the turbine inlet annulus.
Figure 6B:
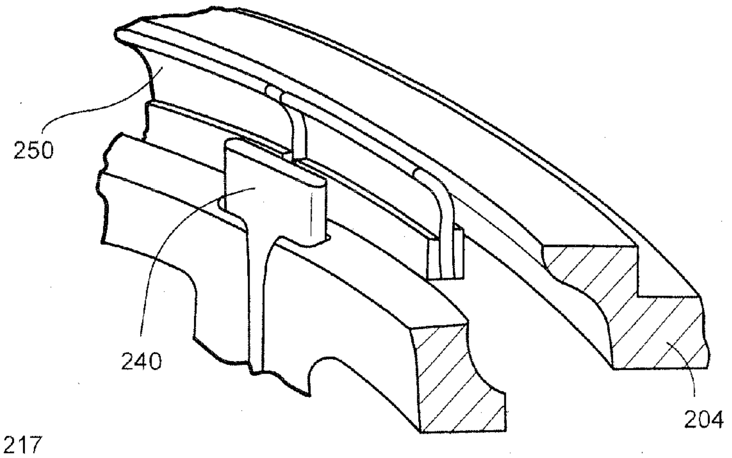
Fig. 6b BACKGROUND ART
FIG. 6B is a partial perspective view illustrating how a combustor outlet is joined to the outer annulus wall of the turbine inlet annulus.
Figure 6C:
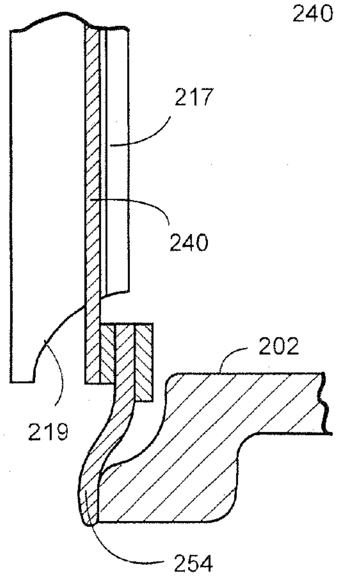
Fig. 6c BACKGROUND ART
FIG. 6C is a partial cross-sectional view illustrating how a combustor outlet is joined to the inner annulus wall of the turbine inlet annulus.

FIGS. 6A and 6C are partial cross-sectional views that are taken along the gap between the sides of two adjacent combustor outlets. Thus, FIGS. 6A and 6C show the side surface of the combustor outlet. FIG. 6B is a perspective view showing this interface. These figures illustrate how the inner and outer circumferential seals are mounted between the combustor outlets and the inner and outer annulus walls of the turbine inlet annulus. These figures also illustrate the side seal that runs along the sides of the combustor outlets.

As shown in FIGS. 6A and 6B, a multilayered outer circumferential seal 250 is mounted between the outer seal surface 218 of a combustor outlet and the outer annulus wall 204. In addition, the side seal 240 is pressed into engagement with the rear flange surface 217 formed on the rear face of the sidewall of the combustor outlet.

As shown in FIG. 6C, the inner circumferential seal 254 is mounted between the inner annulus wall 202 and an inner seal surface 219 located on the bottom edge of the combustor outlet.

When the side seal 240 has a length as illustrated in FIGS. 6A and 6B, small apertures can develop at the corners or edges of the seal when the hot combustion gases cause expansion of the various parts.

Figure 7A:
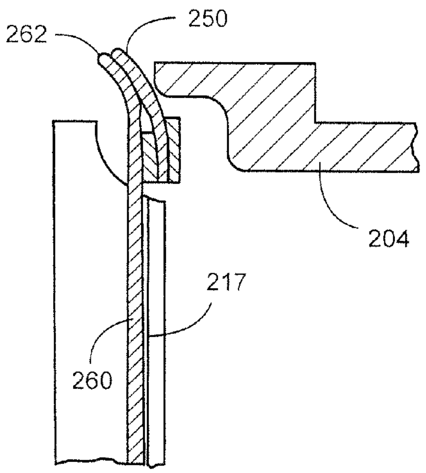
FIG. 7A is a partial cross-sectional view illustrating how a combustor outlet is joined to the outer annulus wall of the turbine inlet annulus using a different type of side seal.
Figure 7B:
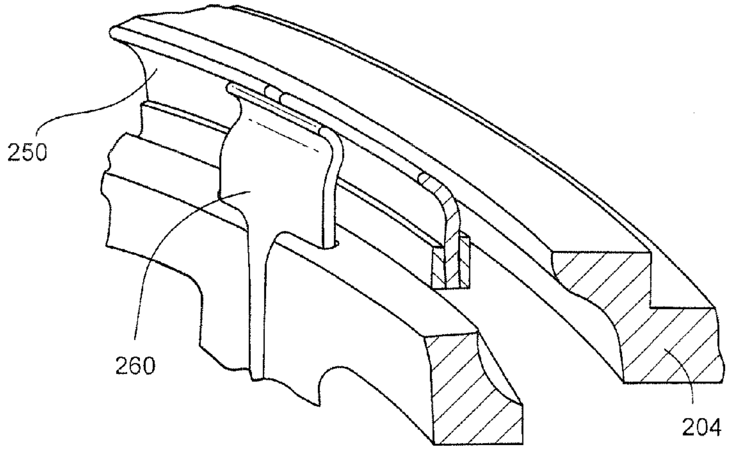
FIG. 7B is a partial perspective view illustrating how a combustor outlet is joined to the outer annulus wall of the turbine inlet annulus using a different type of side seal.
Figure 7C:
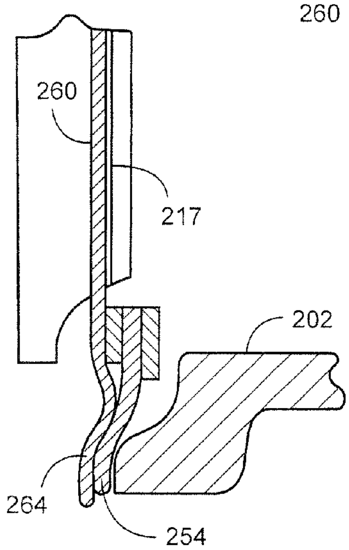
FIG. 7C is a partial cross-sectional view illustrating how a combustor outlet is joined to the inner annulus wall of the turbine inlet annulus using a different type of side seal.

FIGS. 7A-7C illustrate an alternate side seal design which can help to prevent apertures from developing between the seals and the various parts of turbine inlet annulus and the combustor outlets. As shown in FIGS. 7A and 7B, a first end 262 of the alternate side seal 260 extends further outward than the first end of the side seal 240 illustrated in FIGS. 6A and 6B. As shown in FIGS. 7A and 7B, the first end 262 of the alternate side seal 260 is pressed into engagement with the entire rear surface of the outer circumferential seal 250. The side seal 260 is deliberately configured so that it is flexible, and so that it can abut and seal against the rear surface of the outer circumferential seal 250.

Likewise, a second end 264 of the side seal 260 extends further inward than the second end of the side seal shown in FIG. 6C. Thus, the second end 264 of the side seal 260 shown in FIG. 7C can abut and seal against the rear face of the inner circumferential seal 254.

A side seal 260 as illustrated in FIGS. 7A-7C can provide a better seal between the various elements of the turbine inlet annulus and the combustor outlets. The side seal can prevent the development of apertures which allow combustion gases to leak. Thus, the side seal can improve the overall efficiency of the turbine engine 100.

The inner and outer circumferential seals are typically formed from multiple layers which are each wrapped in a metallic mat. The side seal can likewise be formed of one or more layers of a material which is also wrapped in a metallic mat. However, the first and second ends of the side seal should be made sufficiently flexible so that they can conform to the shape of the rear faces of the inner and outer circumferential seals, to provide a good seal between the side seal and the inner and outer circumferential seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of sealing a plurality of combustors to an inlet annulus of a turbine engine, comprising:

- arranging a plurality of combustors around the inlet annulus;
- mounting an inner circumferential seal between the inner annulus wall and corresponding surfaces of each of the combustor outlets;
- mounting an outer circumferential seal between the outer annulus wall and corresponding surfaces of each of the combustor outlets; and
- mounting a side seal between each pair of adjacent combustor outlets to seal a space between sides of the combustor outlets, wherein a first end of each side seal abuts a rear side of the outer circumferential seal, extends across the entire height of the outer circumferential seal, and extends outward beyond the outer circumferential seal, and wherein a second end of each side seal abuts a rear side of the inner circumferential seal, extends across the entire height of the inner circumferential seal, and extends inward beyond the inner circumferential seal.

2. The method of claim 1, wherein the step of mounting an inner circumferential seal comprises mounting a plurality of arc-shaped seal segments between the inner annulus wall and corresponding surfaces of each of the combustor outlets.

3. The method of claim 2, wherein the step of mounting an outer circumferential seal comprises mounting a plurality of arc-shaped seal segments between the outer annulus wall and corresponding surfaces of each of the combustor outlets.

4. The method of claim 1, wherein mounting each side seal comprises mounting the side seal against rear faces of side flanges that extend along sides of the combustor outlets.

5. The method of claim 4, wherein mounting each side seal further comprises:

- pressing the first end of each side seal into engagement with the rear side of the outer circumferential seal so that it conforms to the shape and seals against the rear side of the outer circumferential seal; and
- pressing the second end of each side seal into engagement with the rear side of the inner circumferential seal so that it conforms to the shape and seals against the rear side of the inner circumferential seal.

* * * * *